United States Patent
Reinhart et al.

(10) Patent No.: US 10,609,326 B2
(45) Date of Patent: Mar. 31, 2020

(54) SELF-CONTAINED VIDEO SECURITY SYSTEM

(71) Applicant: TEKVOX, Inc., Austin, TX (US)

(72) Inventors: James Timothy Reinhart, Austin, TX (US); Martin James Autry, Buda, TX (US)

(73) Assignee: TekVox, Inc., Austin, TX (US)

( * ) Notice: Subject to any disclaimer, the term of this patent is extended or adjusted under 35 U.S.C. 154(b) by 0 days.

(21) Appl. No.: 15/723,397

(22) Filed: Oct. 3, 2017

(65) Prior Publication Data
US 2018/0115739 A1 Apr. 26, 2018

Related U.S. Application Data (60) Provisional application No. 62/411,126, filed on Oct. 21, 2016.

(51) Int. Cl.
| | | |
|---|---|---|
| *H04N 7/00* | (2011.01) | |
| *H04N 5/77* | (2006.01) | |
| *H04N 7/18* | (2006.01) | |
| *H04N 5/907* | (2006.01) | |
| *H04N 7/10* | (2006.01) | |

(52) U.S. Cl.
CPC .............. *H04N 5/772* (2013.01); *H04N 5/907* (2013.01); *H04N 7/183* (2013.01); *H04N 7/10* (2013.01)

(58) Field of Classification Search
CPC .............. H04N 7/183; G08B 13/19697; G08B 13/19626; G08B 15/001
See application file for complete search history.

(56) References Cited

U.S. PATENT DOCUMENTS

| | | | | |
|---|---|---|---|---|
| 6,091,453 A * | 7/2000 | Coan | ................... | H04N 5/2251 248/187.1 |
| 7,131,136 B2 * | 10/2006 | Monroe | ........... | G08B 13/19641 725/105 |
| 8,031,264 B2 * | 10/2011 | Iwamura | ................ | H04N 7/181 348/143 |
| 8,491,159 B2 * | 7/2013 | Recker | ................... | H02J 7/025 362/276 |
| 8,525,877 B2 * | 9/2013 | Lortie | ................... | H04N 7/183 348/82 |
| 8,562,158 B2 * | 10/2013 | Chien | ................... | F21V 19/00 362/276 |
| 9,628,688 B2 * | 4/2017 | Martin | ................... | G01P 15/00 |
| 2001/0037509 A1 * | 11/2001 | Kligman | ................ | H04N 7/181 725/105 |
| 2003/0081121 A1 * | 5/2003 | Kirmuss | ................ | B60R 11/02 348/143 |
| 2003/0149816 A1 * | 8/2003 | Poo | ........................ | G06K 19/07 710/62 |

(Continued)

*Primary Examiner* — Frank F Huang
(74) *Attorney, Agent, or Firm* — Koffsky Schwalb LLC; Mark I. Koffsky (57) ABSTRACT

The present invention provides full compliance with Texas SB 507 and is a cost-effective drop-in solution requiring very little resources to install and operate. The system may use off-the-shelf components run by proprietary software further reducing initial cost outlays. The system may include an electric source, a computer having a primary storage device powered by the electric source, a backup storage device connected to the computer, a camera for recording audio data and video data and a ceiling box.

20 Claims, 5 Drawing Sheets

(56) References Cited

U.S. PATENT DOCUMENTS

| | | | |
|---|---|---|---|
| 2004/0038169 A1* | 2/2004 | Mandelkern | A61B 1/24 433/29 |
| 2004/0145676 A1* | 7/2004 | Lin | H04N 1/00204 348/374 |
| 2006/0159164 A1* | 7/2006 | Finizio | B64D 45/0015 375/240.01 |
| 2008/0036863 A1* | 2/2008 | Esbensen | G08B 13/19656 348/159 |
| 2008/0129822 A1* | 6/2008 | Clapp | H04N 5/77 348/143 |
| 2008/0297587 A1* | 12/2008 | Kurtz | G06K 9/00335 348/14.08 |
| 2009/0256908 A1* | 10/2009 | Chen | G08B 13/19641 348/143 |
| 2010/0130054 A1* | 5/2010 | Le | H01B 7/0838 439/502 |
| 2010/0198009 A1* | 8/2010 | Farr | A61B 1/00103 600/109 |
| 2011/0099095 A1* | 4/2011 | Moore | G06Q 10/063 705/30 |
| 2011/0144517 A1* | 6/2011 | Cervantes | A61B 5/08 600/538 |
| 2011/0189936 A1* | 8/2011 | Haspers | A47B 81/00 454/184 |
| 2011/0211069 A1* | 9/2011 | Sybesma | H04N 7/185 348/143 |
| 2011/0234807 A1* | 9/2011 | Jones | G08B 13/19641 348/159 |
| 2012/0075465 A1* | 3/2012 | Wengrovitz | H04N 7/181 348/143 |
| 2012/0086802 A1* | 4/2012 | Eng | A01K 61/95 348/135 |
| 2013/0019124 A1* | 1/2013 | Grimshaw | G06F 11/2015 714/24 |
| 2013/0061624 A1* | 3/2013 | Zwinkels | H05K 7/1497 62/259.4 |
| 2014/0267706 A1* | 9/2014 | Springer | H04N 7/18 348/143 |
| 2016/0134737 A1* | 5/2016 | Pulletikurty | G06F 3/0227 715/735 |

* cited by examiner

SELF-CONTAINED VIDEO SECURITY SYSTEM

REFERENCE TO PRIOR APPLICATIONS

This application claims the benefit of U.S. Provisional Patent Application Ser. No. 62/411,126 filed on Oct. 21, 2016.

FIELD OF THE DISCLOSURE

The present invention is in the field of Audio-Visual (A/V) security. More specifically, the field of the invention is in maintaining video record of special-needs or other classroom activity to satisfy both student safety and legal requirements.

BACKGROUND

I. SB 507's Requirements to Install Video Cameras in the Classroom

The 84th Texas Legislature recently passed Senate Bill (SB) 507, which was signed by Governor Greg Abbott into law on Jun. 19, 2016.

SB 507 requires Texas school districts to install audio/video monitoring equipment in any self-contained classroom in which special education services are being provided to at least 50 percent of the students for at least 50 percent of the school day. The requirement is triggered in the event that a parent, school board member, or staff member on the campus requests that audio/video monitoring equipment be installed. The bill also requires school districts to store the audio and video recordings for not less than six months and to release the footage to persons specified by the bill. The camera equipment be capable of recording audio from all areas of the classroom or other special education setting. Real-time monitoring is not permitted under the law.

Under SB 507, the following groups of people may have access to certain footage in certain situations:

1. A school district employee or a parent or guardian of a student who is involved in an incident documented by the recording for which a complaint has been reported to the district, on request of the employee, parent, or guardian, respectively;

2. Appropriate Department of Family and Protective Services personnel as part of an investigation of child abuse or neglect in a school setting under Section 261.406 of the Texas Family Code;

3. A peace officer, a school nurse, a district administrator trained in de-escalation and restraint techniques as provided by commissioner rule, or a human resources staff member designated by the board of trustees of the school district or the governing body of the open-enrollment charter school in response to a complaint or an investigation of district or school personnel or a complaint of abuse committed by a student; or 4. Appropriate agency or State Board for Educator Certification (SBEC) personnel or agents as part of an investigation.

The mandate of video and audio capture by Texas law requires a balance between security and privacy. The video capture must be maintained securely so that it may only be accessed by properly authorized personnel.

II. SB 507-Compliant Solutions

There are many video security systems available that involve the use of expensive cameras linked to control systems which stream data to cloud sites for archival purposes. Setting up and maintaining these sites becomes burdensome and costly as the collected data grows requiring ever increasing storage and maintenance fees.

Because of the unique requirements of SB 507 (and any similar legislation that may be enacted in the future), much of this equipment is unneeded and unnecessary. Therefore, a totally self-contained and managed system that is built for the specific requirements of SB 507 would be desirable. Such a system has the advantage of alleviating the need for costly storage management and user required maintenance.

SUMMARY OF THE INVENTION

The present invention is a secured self-contained ceiling-mounted audio/video recording system capable of recording and storing 6 months (1667 hours) of high-definition video and audio. The system provides full compliance with SB 507 and is a cost-effective drop-in solution requiring very little resources to install and operate. The system may be called ViewVault and use off-the-shelf components run by proprietary software further reducing initial cost outlays.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Introduction

In its primary mode of operation, the system requires only a single connection to a 110V power source and automatically goes into operation.

Mechanical System.

The system may be housed in a rugged TEKVOX 78038 ETL-certified ceiling box. Secured to building infrastructure with included safety cables and protected with a combination lock, the enclosure houses the recording system and is accessible only to authorized personnel.

Included with the system may be a customer-specific camera/microphone kit and all cables and accessories needed to quickly install the system. The mechanical system defends the contents against all but the most determined physical attacks.

Camera/Microphone System.

The system may leverage the great variety and sophistication of commercially available camera systems. The default system may include an advanced LogiTech camera with 78 degree viewing angle and 25 ft plenum-rated cable. This single camera, located in a suitable corner, can provide 100% visibility for the vast majority of room configurations. Where needed, an additional Logitech camera and audio-only microphones can be added for room-specific applications. The system supports a wide-variety of make & model cameras and can support virtually any room configuration with only a modest increment in base cost.

Electronics System.

The system may be based on the latest generation of the Intel i7, currently the most modern media-friendly microprocessors in the industry. Coupled with 16+GB of dynamic RAM, 2+TB of permanent storage and 32+GB of removable storage, the system core is a powerful platform for innovative recording applications.

The base configuration may be enhanced with networking extensions, back-up drives, larger removable media and a variety of other options. The system is resilient and will automatically start operation when powered on and will resume operation automatically after any interruption in power.

A simple visual indicator may be provided to verify system integrity without needing to access or open the systems.

Recording System.

The system may record all available inputs based on scheduled process that is programmed into the system at manufacturing time. This schedule may be easily modified by the user as needed with tools provided to the user. In addition, the system may be configured to detect motion events via its camera and record ad-hoc for 30 minutes after the motion trigger.

The system may utilize a standard Windows file structure to store media tagged by date and time in 30 minute windows. This makes it very simple to navigate a ViewVault repository when needed to retreive content.

Generally, a classroom schedule may be pre-programmed into the system for 'always record' time slots and the system may capture motion-activated events outside this schedule. The motion detector may cause the camera to be selectively activated and deactivated. The system may be easily customized for any mix of scheduled/ad-hoc recording.

The system may use H.264 protocol for real-time recording to is main storage. During 'off-time', the system may automatically transcode recorded media to H.265 protocol for long-term storage. These recordings are saved to the long-term storage and are also written to a removable solid-state storage unit ("Thumb" drive) inserted in a USB slot.

In general, recordings made during a normal 'day', are transcoded and stored in both locations prior to the start of the next day. In typical operation, the system records with no human intervention or outside resource until a request for 'production of media' is made. In most cases, if the request is within 30 days of the recording date, an administrator with access to the ViewVault combination, may simply unlock the enclosure, remove the Thumb drive, download the requested day/time media and replace the Thumb drive. This operation requires but a few minutes with very little training or overhead.

Recorded media is automatically deleted at the end of the pre-programmed retention period (e.g. 6 months for SB507).

Operating Modes.

1. "Black box mode", which records and stores automatically. Here, no network connections are needed and this provides safe, secure, reliable service at the lowest possible cost. No reliance on network, network bandwidth or any other external factor is needed except power. The system is extremely reliable, and attention is only needed for media production requests which are simple to service. The system cannot be attacked or compromised expect by local physical action.

2. 'Lightly' connected: Blackbox+WiFi/LAN access for non-real-time media download only. This instance is not network manageable.

3. "Fully networked": fully networked streaming with network manageability.

Thus, the system can operate stand-alone in 'black-box' mode requiring no network connection or can be remotely managed via wired or wireless networks with an Enterprise Management System. In black-box mode, the system is configured prior to shipment and is placed discreetly in the ceiling tile grid with included camera and mounting accessories. Only a single electrical connection is required. The system automatically goes into operation when powered and no human intervention is required for full SB507-compliant operation. When necessary to view the stored media an authorized administrator can unlock the enclosure and easily remove a small solid-state storage unit with the most recent recordings for quick examination or remove the entire tray-mounted electronics for deep forensics of the entire media system—all media and all system logs are available for discovery. The system's electronics are physically locked (which are selectively lockable and unlockable) and password-protected to prevent unauthorized tampering.

The system can optionally be connected to the campus network via Ethernet or WiFi for remote management, real-time streaming or ad-hoc retrieval of stored content. In normal operation, this uses negligible network bandwidth or resources. The system may provide comprehensive and secure management of a virtually unlimited number of computer systems spread across one or many campus domains. The management system can be hosted on a private cloud-based portal or on customer premise.

II. Physical Configuration

The present invention comprises a hardware platform consisting of a ceiling enclosure used to house a small computer and an attached webcam. Utilizing the hardware platform, the proprietary software system then provides for the capture of audio and video within the designated room. When powered, the system automatically goes into operation and no human intervention is required for SB 507 compliant operation.

Figure 1A:
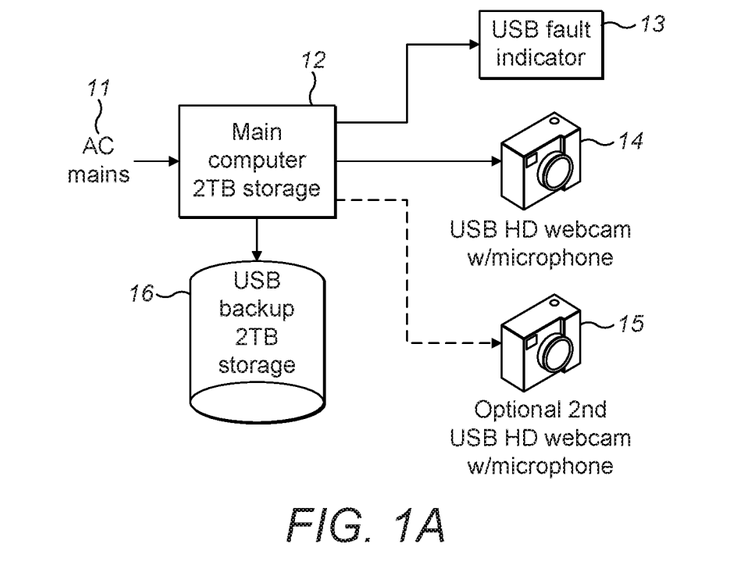
FIG. 1A shows a functional block diagram of a typical camera system.

Turning to FIG. 1A shown is a functional block diagram 10 of the camera system. Shown are the AC mains 11 that power the main computer 12 with 2 TB of storage (although any amount of storage may be used). The main computer 12 is connected to a USB backup 16 with 2 TB of storage (although any amount of storage or any connectivity protocol may be used). A USB fault indicator 13 provides a notice if there is a problem with the main computer 12. A USB HD WebCam with microphone 14 and an optional second USB HD WebCam with microphone 15 (although any audio/visual capturing system or any connectivity protocol may be used).

Figure 1B:
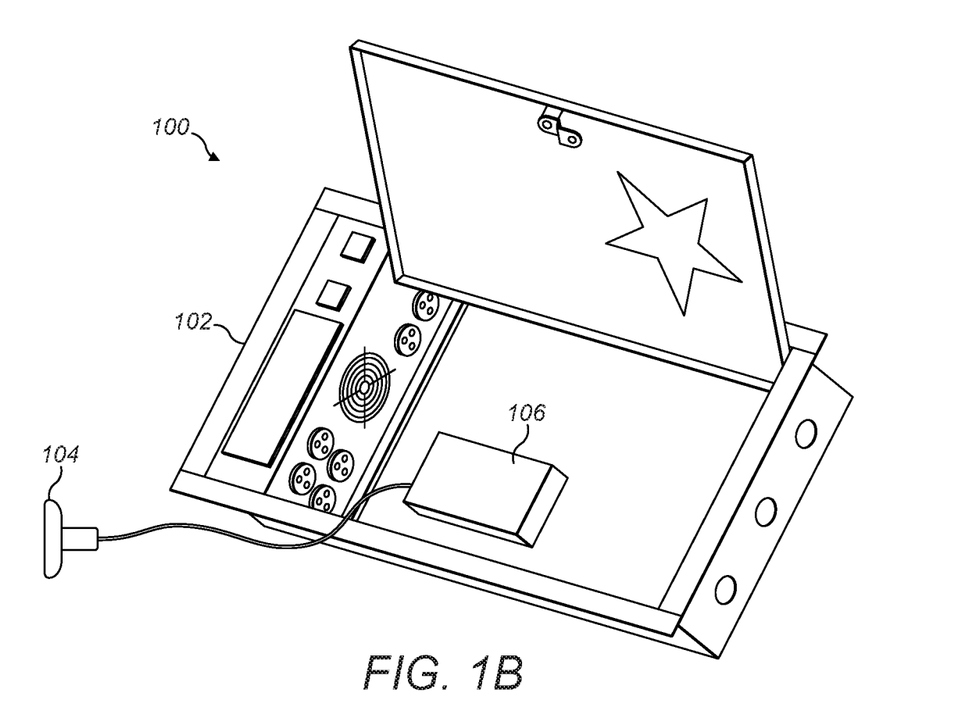
FIG. 1B shows a mechanical view of a typical camera system.

Turning to FIG. 1B, shown is a mechanical view 100 of system. Here, the computer 106 is mounted inside of the ceiling box 102. The WebCam 104 is attached via an appropriate cable routed through the box ceiling 102 to the computer 106. Power is routed directly to the ceiling box 102 via an external outlet box by a qualified electrician. The computer 106 is attached to power via internal outlets supplied within the ceiling box 102 and also connected to the network via a direct or Wi Fi connection. Once powered, the computer 106 is configured to automatically boot and launch the Video Security System software. All startup operational configuration is stored in a settings file for the application. For standard operation, the system operates as a stand-alone device requiring no network connection or maintenance. In stand-alone mode the system is configured prior to shipment and is installed in the ceiling tile grid with the included cameras, microphones and accessories. Only a single electrical connection is required.

III. Modes of Operation

The recording mode may be set to "automatic mode" that begins and ends based on motion detection in the classroom or a "scheduled mode" where the recording begins and ends at specific pre-set times throughout a classroom week.

If automatic mode is defined by the settings file, the system wakes into a motion detection mode where any motion detected causes the system to go into record mode. Once in record mode, motion detection is turned off until the pre-defined record segment length is reached. When reached, the file is closed and the unit goes back into motion detection mode and repeats the process until no further motion is detected.

Figure 2:
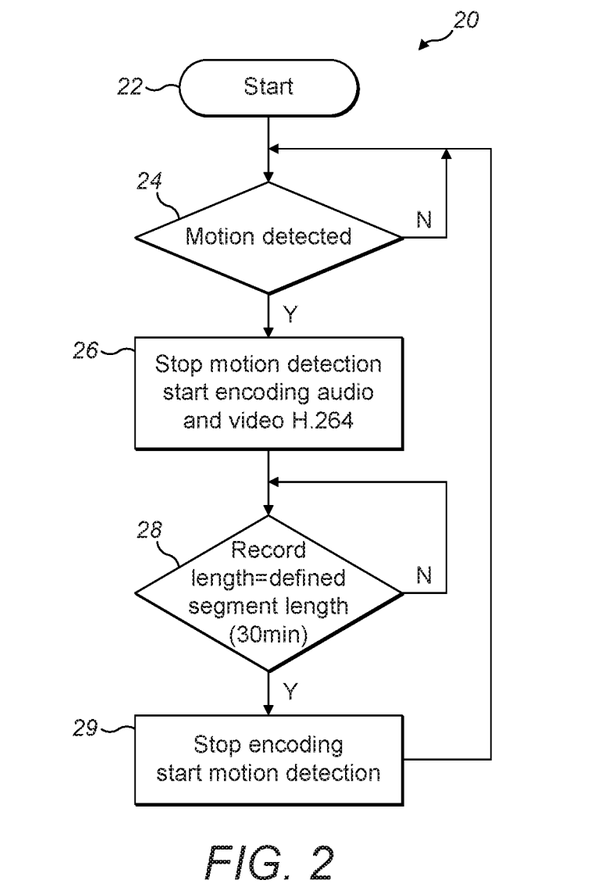
FIG. 2 shows a process flow of typical system usage in automatic mode.

Turning to FIG. 2, shown is an "automatic mode" process flowchart 20. When the automatic process is activated 22, a motion detector determines if there is motion in the classroom 24. If not, the motion detector continues to check for motion 24 until motion is detected. Once that occurs, motion detection is stopped and video and audio recording (possibly in H.264) begins 26. The recording continues until the record length of the recording reaches the defined segment length (possibly 30 minutes) 28. When the defined segment length is reached, encoding is stopped and motion detection is started 29 and the cycle begins anew by checking for motion 24.

If configured in schedule mode, the system will load a pre-configured weekly schedule on startup. Once loaded, the system will monitor current time until an active schedule time is reached. When an active scheduled time interval is reached, the system will go into a record mode, recording all video and audio into the current day directory in, for example, H.264 format. The recording continues until either the pre-defined video segment length is reached as set in the settings file, or the end of the active schedule time is reached. If the segment length is reached before the end of the schedule time, the current file is closed and a new one is opened to record another segment interval. The cycle is repeated until the schedule end time is reached, whereby the system closes the current recording file and goes to idle state waiting for another active schedule time.

Figure 3:
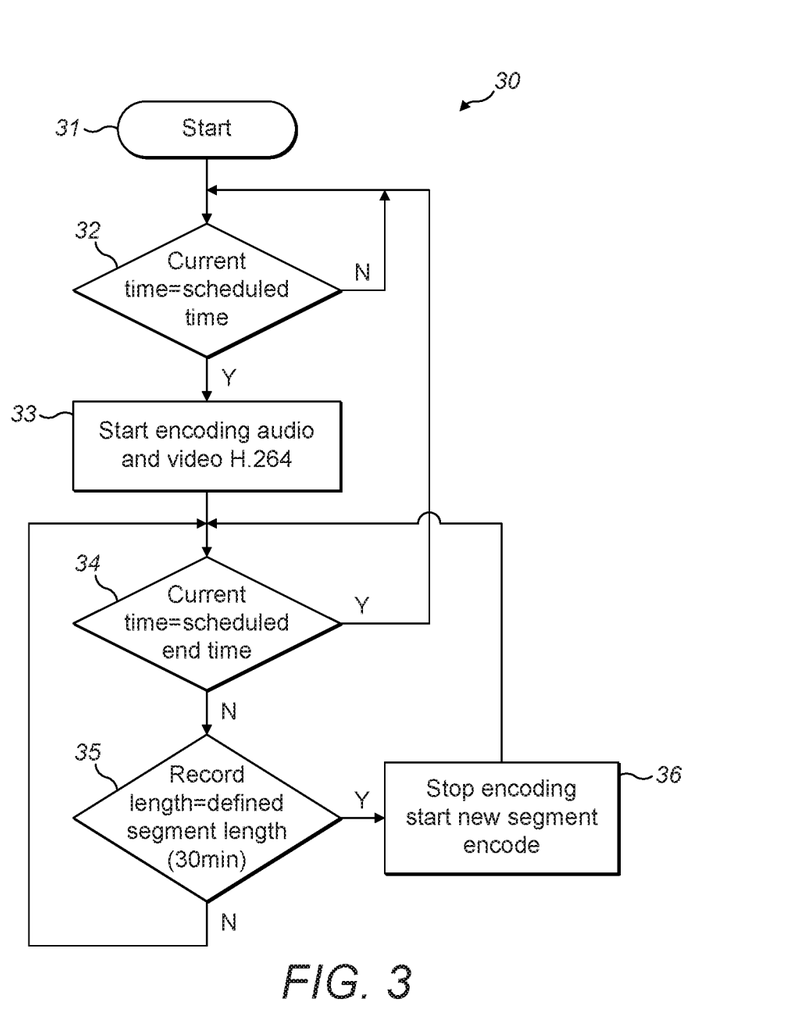
FIG. 3 shows a process flow of typical system usage in schedule mode

Turning to FIG. 3, shown is a "scheduled mode" process flowchart 30. The process begins 31 with a timer checking if the current time is the scheduled time 32. If not the timer checks again 32 until the current time reaches the scheduled time, at which point the video and audio recording (possibly in H.264) begins 33. Two checks are then performed. The first check is to determine whether the current time is the scheduled end time 34. If it is, then the process resets to check if the current time is the next scheduled time 32. If the current time is not the scheduled end time, the second check determines whether the record length of the recording reaches the defined segment length (possibly 30 minutes) 35. If the segment length has not been reached, the process returns to the first check 34. When the defined segment length is reached, encoding is stopped for that segment and new segment encoding step and motion detection is started 36. The cycle begins anew by checking if the current time equals the scheduled end time 34.

IV. Video and Audio Recording Formats

The initial video recording may use the H.264 format for temporary storage and then may later be converted to H.265 format for more permanent storage (subject to the 6-month retention requirement, discussed below).

H.264 or MPEG-4 Part 10, Advanced Video Coding (MPEG-4 AVC) is a block-oriented motion-compensation-based video compression standard. High Efficiency Video Coding (HEVC), also known as H.265 and MPEG-H Part 2, is a video compression standard. H.265 offers about double the data compression ratio of H.264 at the same level of video quality, or substantially improved video quality at the same bit rate.

In most ways, H.265 is an extension of the concepts in H.264. Both work by comparing different parts of a frame of video to find areas that are redundant, both within a single frame as well as subsequent frames. These redundant areas are then replaced with a short description instead of the original pixels. The primary changes for H.265 include the expansion of the pattern comparison and difference-coding areas from 16×16 pixel to sizes up to 64×64, improved variable-block-size segmentation, improved "intra" prediction within the same picture, improved motion vector prediction and motion region merging, improved motion compensation filtering, and an additional filtering step called sample-adaptive offset filtering. Effective use of these improvements requires much more signal processing capability for compressing the video, but has less impact on the amount of computation needed for decompression.

A specific set time in the settings file determines when the transcode cycle is to start. This time is usually set after hours when no activity is occurring. When this time is reached, all video files recorded during the day and any files remaining from previous transcode cycles are transcoded from H.264 to H.265 and stored into directories indicating the month of operation. The system checks that the transcoded file exists prior to removing the source H.264 file. This process continues until all files are transcoded, or one hour prior to the start of another active schedule time is reached. Any files not transcoded are held until the next transcode cycle period thus allowing for weekend or holiday "catch-up time" if required. Once an H.264 file is transcoded and verified, the source file is then removed.

Figure 4:
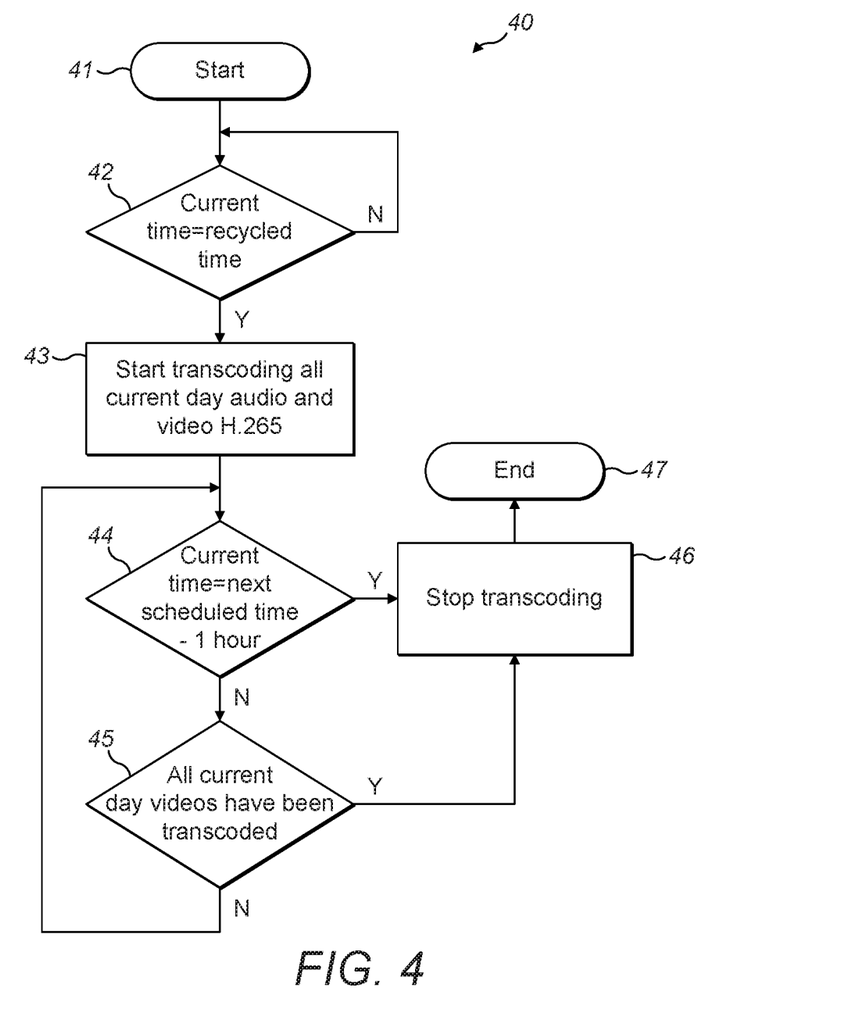
FIG. 4 shows a process flow of transcoding cycle

Turning to FIG. 4 shown is a transcode flowchart 40. The process begins 41 with a check to determine if the current time is the recycle time for transcoding 42. If it is not time, the check occurs again 42. If it is time for transcoding, the transcoding begins for the current day audio and video into H.265 43. Next the current time is checked to determine if it is less than one hour until the next scheduled time for operation 44. If so, the transcoding is stopped 46 and the process ends 47. If not, a check is performed to determine if all current day videos have been transcoded 45. If not then the process returns to determine if it is less than one hour until the next scheduled time for operation 44. If so, the transcoding is stopped 46 and the process ends 47.

Figure 5:
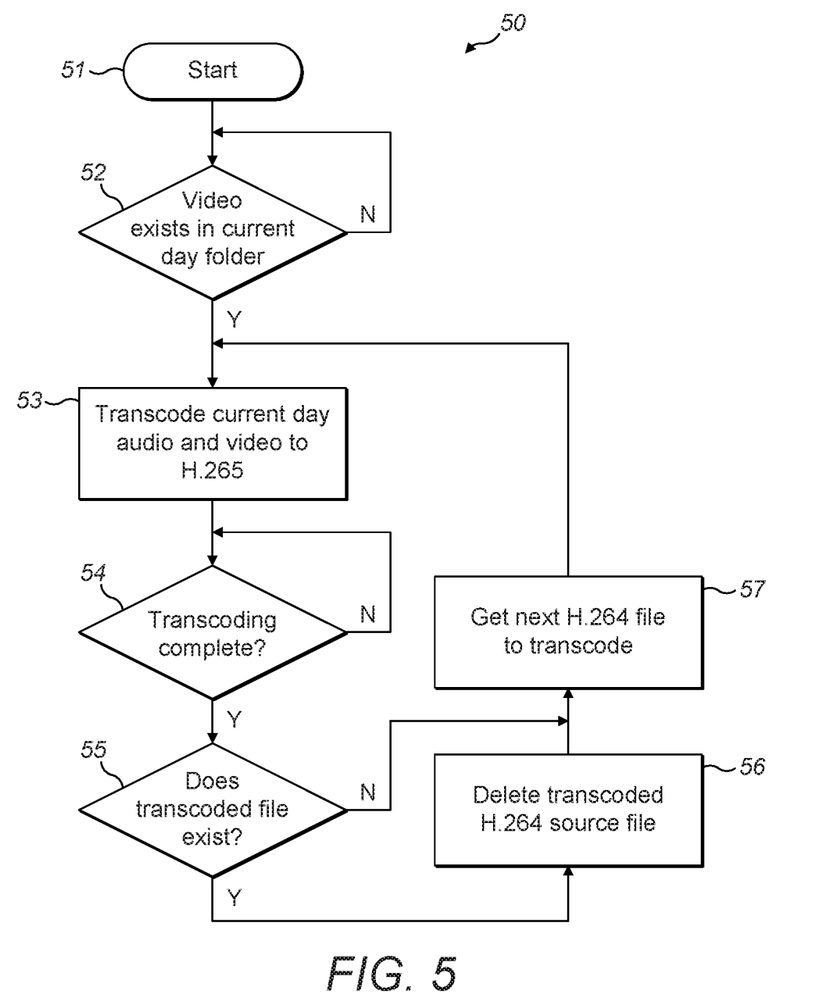
FIG. 5 shows a more expanded flowchart of transcode operation.

Turning to FIG. 5, shown is expanded flowchart 50 for the transcode process. The process starts 51 by checking if a video eligible for transcoding exists in the current day folder 52. If not, the check occurs again 52. If so, the process of transcoding the audio and video to H.265 begins 53. The process then checks if the transcoding process is complete 54. If not, the transcoding continues and another completion check is made 54. If so, a determination is made whether the transcoded source file (usually in H.264) still exists 55. If it does exist, the transcoded source file 56 is deleted and then the next H.264 file is obtained to transcode 57. If it does not exist, the next H.264 file is obtained to transcode 57. In either case, the process returns to the process of transcoding the audio and video to H.265 53.

The current transcode cycle may be required until more cost effective H.265 encoders become available allowing for real-time "on the fly" direct encoding to the final H.265 format.

V. System File Purge

Based on a 40 hour work week, a 2 TB drive will allow for up to 6 months of storage retention as currently mandated by SB 507. Once an archived video has aged over 6 months, it may be automatically purged in order to allow for additional future video storage VI. Video File Access Access to the videos may be obtained via network access to the contained small computer utilizing Microsoft Windows or Apple Macintosh OS security for remote connectivity permissions. Recordings are captured in standard video file format and are easily viewable on any common laptop computer. Simple inquiries can be resolved in minutes with no special training. Access to the recorded video may be obtained by qualified personnel with security access to the system via network connection. Should it be necessary, the entire electronic system is mounted on a removable tray and may be fully removed for detailed discovery or forensics. In addition, the times of removal of the storage device and/or cameras may be logged for further auditing purposes.

The files may be stored in folders indicating their respective month of occurrence. Each file name may be labeled as yyyy-mm-dd_hh_mm_ss.mp4 to allow for each determination of the desired time period for review. When it is necessary to view the stored recordings, an authorized administrator may unlock the rugged steel ceiling unit and extract the removable storage unit that contains a password-protected backup copy of all recordings (originals are maintained in the system recording unit).

The reason that recordings are stored in 30-minute increments in individual files named with a 'room_date_time' format is that these files are easy to browse and locate desired content. The 30-minute increments may be labeled in "room-date-time" format and allow for limited access to the relevant video as may be required by law while allowing other video increments to remain possibly password protected and unviewed (which also may be required by law).

The system may optionally be connected to a campus network via Ethernet or Wi-Fi for remote management or ad-hoc retrieval of stored content (Note: real-time remote monitoring of a classroom is not allowed under SB 507). In normal operation, the system uses negligible network bandwidth or resources to access the videos.

VII. Conclusion

It is contemplated that any optional feature of the inventive variations described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the to be appended claims. It is further noted that the appended claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in the to be appended claims shall allow for the inclusion of any additional element irrespective of whether a given number of elements are enumerated in the to be appended claim, or the addition of a feature could be regarded as transforming the nature of an element set forth in the to be appended claims. Except as specifically defined herein, all technical and scientific terms used herein are to be given as broad a commonly understood meaning as possible while maintaining to be appended claim validity.

The breadth of the present invention is not to be limited to the examples provided and/or the subject specification, but rather only by the scope of the to be appended claim language. Use of the term "invention" herein is not intended to limit the scope of the appended claims in any manner. Rather it should be recognized that the "invention" includes the many variations explicitly or implicitly described herein, including those variations that would be obvious to one of ordinary skill in the art upon reading the present specification. Further, it is not intended that any section of this specification (e.g., the Summary, Detailed Description, Abstract, Field of the Invention, etc.) be accorded special significance in describing the invention relative to another or the to be appended claims. All references cited are incorporated by reference in their entirety. Although the foregoing invention has been described in detail for purposes of clarity of understanding, it is contemplated that certain modifications may be practiced within the scope of the to be appended claims.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system comprising:
a non-networked electric source;
a non-networked computer having a non-networked primary storage device powered by the electric source;
a non-networked backup storage device connected to the non-networked computer;
a non-networked camera for recording audio data and video data;
a ceiling box;
wherein the non-networked primary storage device and the non-networked backup storage device store the audio data and the video data;
wherein the non-networked computer is installed in the non-networked ceiling box;
wherein the electric source is installed in the non-networked ceiling box;
wherein the non-networked camera is attached to the non-networked computer via a cable routed through the ceiling box
wherein the non-networked camera is capable of being selectively operated in automatic mode where recording begins and ends based on motion detection, and in scheduled mode where recording begins and ends based on a pre-set schedule.

2. The system as in claim 1 wherein the ceiling box is selectively lockable and unlockable.

3. The system as in claim 2 wherein the audio data and the video data use H.264 protocol.

4. The system as in claim 3 wherein the audio data and the video data are further transcoded to H.265 protocol to create storage data.

5. The system as in claim 4 wherein the transcoding occurs at the end of a day.

6. The system as in claim 4 wherein the storage data are written to a non-networked removable storage unit.

7. The system as in claim 2 further comprising a non-networked motion detector that is capable of causing the non-networked camera to be selectively activated and deactivated.

8. The system as in claim 2 wherein the storage data is automatically deleted at the end of the pre-programmed retention period.

9. The system as in claim 2 wherein the storage data is divided into individual 30-minute increments.

10. The system as in claim 9 wherein the storage data is labeled in "room-date-time" format.

11. A method comprising:
installing a non-networked computer having a non-networked primary storage device powered by an electric source;
installing a non-networked backup storage device connected to the non-networked computer;
installing a non-networked camera for recording audio data and video data;
installing a ceiling box;
wherein the non-networked primary storage device and the non-networked backup storage device store the audio data and the video data;
wherein the non-networked computer is installed in the ceiling box;
wherein the electric source is installed in the ceiling box;
wherein the non-networked camera is attached to the non-networked computer via a cable routed through the ceiling box
wherein the non-networked camera is capable of being selectively operated in automatic mode where recording begins and ends based on motion detection, and in scheduled mode where recording begins and ends based on a pre-set schedule.

12. The method as in claim 11 wherein the ceiling box is selectively lockable and unlockable.

13. The method as in claim 12 wherein the audio data and the video data use H.264 protocol.

14. The method as in claim 13 wherein the audio data and the video data are further transcoded to H.265 protocol to create storage data.

15. The method as in claim 14 wherein the transcoding occurs at the end of a day.

16. The method as in claim 14 wherein the storage data are written to a non-networked removable storage unit.

17. The method as in claim 12 further comprising a non-networked motion detector that is capable of causing the camera to be selectively activated and deactivated.

18. The method as in claim 12 wherein the storage data is automatically deleted at the end of the pre-programmed retention period.

19. The method as in claim 12 wherein the storage data is divided into individual 30-minute increments.

20. The method as in claim 19 wherein the storage data is labeled in "room-date-time" format.

* * * * *